US011316210B2

(12) United States Patent
Haindl et al.

(10) Patent No.: US 11,316,210 B2
(45) Date of Patent: Apr. 26, 2022

(54) CONTROL UNIT FOR A BATTERY MODULE OR SYSTEM

(71) Applicant: SAMSUNG SDI CO., LTD., Yongin-si (KR)

(72) Inventors: Michael Haindl, Hartberg (AT); Maximilian Hofer, Hartberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 142 days.

(21) Appl. No.: 16/686,578

(22) Filed: Nov. 18, 2019

(65) Prior Publication Data

US 2020/0161716 A1    May 21, 2020

(30) Foreign Application Priority Data

Nov. 21, 2018   (EP) ..................................... 18207513
Nov. 13, 2019   (KR) ........................ 10-2019-0145353

(51) Int. Cl.
*H01M 10/42* (2006.01)
*H01M 50/20* (2021.01)

(52) U.S. Cl.
CPC ......... *H01M 10/425* (2013.01); *H01M 50/20* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

| 4,910,707 | A | 3/1990 | Schrenk |
| 2005/0067587 | A1 | 3/2005 | Laackmann |
| 2007/0229026 | A1 | 10/2007 | Morioka et al. |
| 2010/0019730 | A1 | 1/2010 | Chueh et al. |
| 2011/0012552 | A1* | 1/2011 | Margalit ................. H02J 7/35 320/101 |
| 2014/0237213 | A1 | 8/2014 | Gill et al. |
| 2015/0135340 | A1 | 5/2015 | Weder et al. |

FOREIGN PATENT DOCUMENTS

| EP | 0 178 512 A1 | 4/1986 |
| EP | 2 645 447 A1 | 10/2013 |
| EP | 3 331 121 A1 | 6/2018 |
| JP | H03-235399 A | 10/1991 |

OTHER PUBLICATIONS

European Examination Report (Rejection) dated Apr. 22, 2020 in corresponding European Application No. 18207513.5.
Extended European Search Report dated May 8, 2019 for European Patent Application No. 18207513.5.

* cited by examiner

*Primary Examiner* — Wyatt P McConnell
(74) *Attorney, Agent, or Firm* — Lee IP Law, PC

(57) ABSTRACT

A controller is for controlling a battery module including a plurality of battery cells in a housing. The controller includes a control module to perform at least one control function with respect to at least one of the plurality of battery cells; and an access detection circuit including a light sensitive element in the housing. The access detection circuit is to output an access detection signal when a light intensity in the housing is greater than a predetermined threshold. The controller is to alter a state of the control module in response to the access detection signal.

5 Claims, 5 Drawing Sheets

CONTROL UNIT FOR A BATTERY MODULE OR SYSTEM

CROSS-REFERENCE TO RELATED APPLICATION

The instant application claims priority under 35 U.S.C. § 119 to European Patent Application No. 18207513.5, filed on Nov. 21, 2018, in the European Patent Office, and entitled: "Control Unit for a Battery Module or System," which is incorporated by reference herein in its entirety. The instant application also claims priority under 35 U.S.C. § 119 to Korean Application No. 10-2019-0145353, filed on Nov. 13, 2019.

BACKGROUND

1. Field

Example embodiments relate to a control unit for a battery module or battery system, to a battery module or battery system including, e.g., a control unit and a method for operating the battery module or battery system.

2. Description of the Related Art

A rechargeable or secondary battery may be repeatedly charged and discharged by a reversible conversion of chemical to electrical energy. Low-capacity rechargeable batteries may be used as power supply for small electronic devices, e.g., cellular phones, notebook computers and camcorders, and high-capacity rechargeable batteries may be used as the power supply for hybrid vehicles and the like.

In general, rechargeable batteries may include an electrode assembly including a positive electrode, a negative electrode, and a separator interposed between the positive and negative electrodes, a case for accommodating the electrode assembly, and an electrode terminal that is electrically connected to the electrode assembly. An electrolyte solution may be injected into the case to enable charging and discharging operations of the battery via an electrochemical reaction of the positive electrode, the negative electrode, and the electrolyte solution. The shape of the case, e.g., cylindrical or rectangular, may be changed according to the battery's intended purpose. Lithium-ion (or lithium polymer) batteries, widely known via their use in laptops and consumer electronics, may be widely used for electric vehicles.

Rechargeable batteries may be used as a battery module including a plurality of unit battery cells that are coupled in series and/or in parallel so as to provide a high energy density, e.g., for motor driving of a hybrid vehicle. For example, the battery module may be formed by interconnecting the electrode terminals of the plurality of unit battery cells according to a required amount of power and in order to realize a high-power rechargeable battery, e.g., for an electric vehicle. One or more such battery modules may be mechanically and electrically integrated, equipped with a thermal management system and a battery management system (BMS) and set up for communication with one or more electrical consumers in order to form a battery system.

For satisfying the dynamic power demands of various electrical consumers, steady exchange of information between the battery system and the controllers of the electrical consumers may be required. This information may include, e.g., an actual state of charge (SoC), potential electrical performance, charging ability, internal resistance, actual or predicted power demands or surpluses of the consumers. Battery systems may include a battery management system (BMS), battery system manager (BSM), or battery management unit (BMU) for processing this information. The BMS/BSM/BMU may communicate to the controllers of the various electrical consumers via a communication bus, e.g., a SPI or CAN interface. The BMS/BSM/BMU may further communicate with each of the battery submodules, e.g., with a cell supervision circuit (CSC) of each battery submodule. Thus, the CSC may be connected to a cell connection and sensing unit (CCU) that interconnects the battery cells of the battery submodule. For example, the BMS/BSM/BMU may be provided for managing the battery pack, e.g., by protecting the battery from operating outside its safe operating area, monitoring its state, calculating secondary data, reporting that data, controlling its environment, authenticating it and/or balancing it.

Battery systems may include a battery housing serving as enclosure to seal the battery system against the environment and providing protection to the battery system from environmental impacts and to protect the environment from any hazards, e.g., toxic fumes, fire, electric arcing, etc. in case of battery failure. Battery systems may be mounted as a whole into their application environment, e.g., an electric vehicle, and all essential parts of the battery system, i.e. the cells, electric interconnectors, and the electronics, may be situated inside the battery housing. Thus, the replacement or analysis of system parts, a battery cell or control electronics, may require the removal of its housing.

Battery systems may be opened and the technology of the battery system may be analyzed by using reverse engineering. Also, the hardware and/or the software of the battery system may be manipulated in order to alter the operation state of the battery system, e.g., in order to increase the performance and/or to circumvent safety measures of the battery system. For example, manipulation may decrease the lifetime of the battery system, and the battery may lose energy and power faster compared to normal use. Further, when a manipulation is reverted to the original version, it may not be possible to detect the manipulation of the battery system.

SUMMARY

Embodiments are directed to a controller for controlling a battery module including a plurality of battery cells in a housing. The controller may include: a control module to perform at least one control function with respect to at least one of the plurality of battery cells; and an access detection circuit including a light sensitive element in the housing. The access detection circuit may be to output an access detection signal when a light intensity in the housing is greater than a predetermined threshold, and the controller may be to alter a state of the control module in response to the access detection signal.

The controller may be to further alter at least one of a hardware state and a software state of the control module in response to the access detection signal.

The access detection signal may be stored in a memory of the controller.

The at least one control function of the control module may be disabled in response to the access detection signal.

The at least one control function of the control module may be enabled by an original equipment manufacturer.

The light sensitive element may be to output a light signal corresponding to a light incident on the light sensitive element in the housing.

The controller may further include a detection element to receive the light signal, to determine whether the light intensity in the housing is greater than the predetermined threshold based on the light signal, and to output the access detection signal when the light intensity in the housing is greater than the predetermined threshold.

The controller may further include a state setting element to receive the access detection signal and to alter the state of the control module based on the received access detection signal.

The controller may further include a power input to receive an operating voltage of the controller and to provide the operating voltage to the control module. The state setting element includes a switching element between the power input and the control module, and the state setting element is to set the switching element to be non-conductive in response to the access detection signal.

The access detection circuit may include at least one fuse that is set to be non-conductive when the light intensity in the housing is greater than the predetermined threshold.

The light sensitive element of the access detection circuit may be to supply energy for setting the at least one fuse to be non-conductive when the light intensity in the housing is greater than the predetermined threshold.

The light sensitive element may include at least one of a light dependent resistor, a photo diode, and a photovoltaic element.

Embodiments are directed to a battery system. The battery system may include: a battery module including a plurality of battery cells in a housing; and a controller to control the battery module. The controller including: a control module to perform at least one control function with respect to at least one of the plurality of battery cells; and an access detection circuit including a light sensitive element in the housing. The access detection circuit may be to output an access detection signal when a light intensity in the housing is greater than a predetermined threshold, and The controller may be to alter a state of the control module in response to the access detection signal.

Embodiments are directed to a method for operating a battery module including a controller and a plurality of battery cells in a housing. The method may include: performing at least one control function with respect to at least one of the plurality of battery cells by the controller; detecting a light intensity in the housing by an access detection circuit of the controller; outputting an access detection signal by the access detection circuit when the light intensity in the housing is greater than a predetermined threshold; and altering a state of the controller in response to the access detection signal.

The method may further include: disabling the at least one control function of the controller in response to the access detection signal, and enabling the at least one control function of the controller by an original equipment manufacturer.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
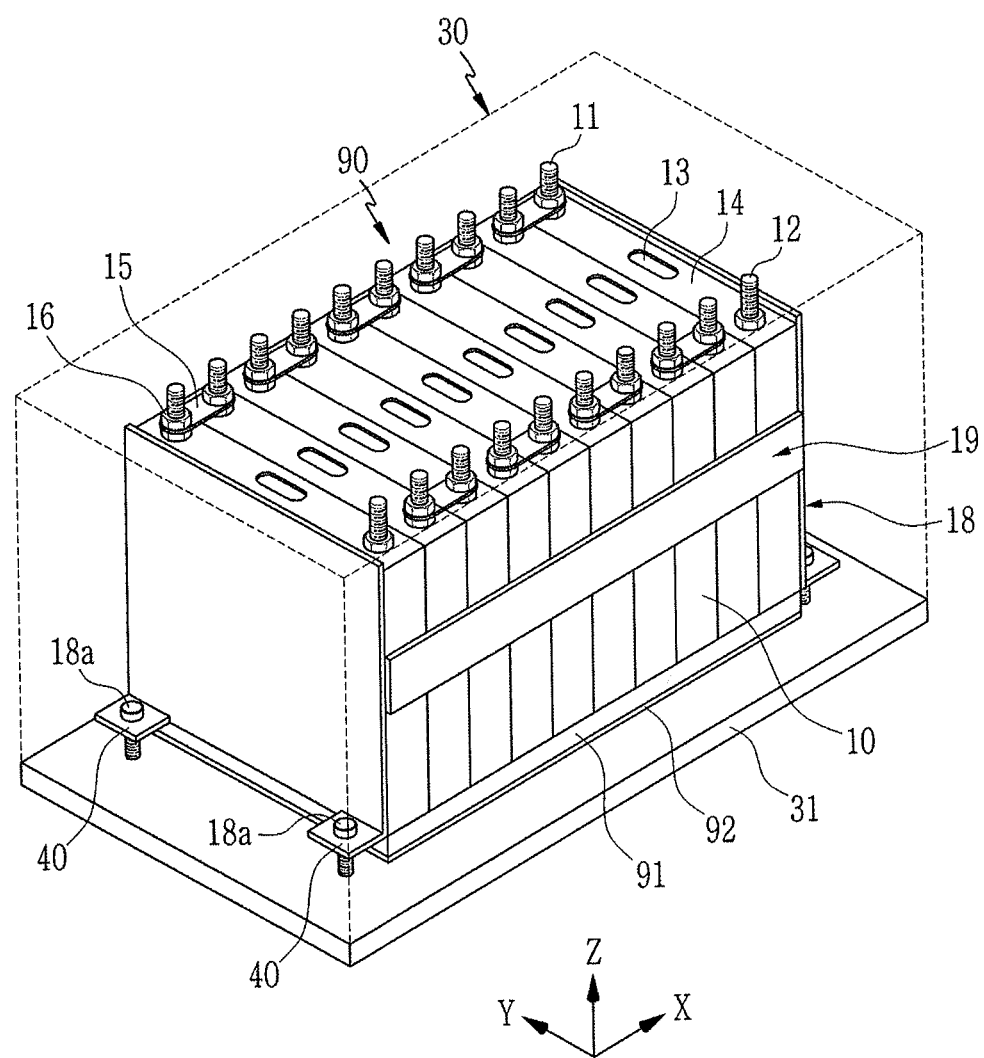
FIG. 1 illustrates a schematic perspective view of a battery module.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. However, the example embodiments may be embodied in various different forms and should not be construed as limited to the illustrated embodiments herein. Rather, these embodiments are provided as examples so that this disclosure will be thorough and complete, and will fully convey the aspects and features of the example embodiments to those skilled in the art. Accordingly, processes, elements, and techniques that are not necessary to those having ordinary skill in the art for a complete understanding of the aspects and features of the example embodiments may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the example embodiments. In the following description, the terms of a singular form may include plural forms unless the context clearly indicates otherwise.

It will be further understood that the terms "include," "comprise," "including," or "comprising" specify a property, a region, a fixed number, a step, a process, an element, and a combination thereof but do not exclude other properties, regions, fixed numbers, steps, processes, elements, and combinations thereof. It will also be understood that when a region or an element is referred to as being "above" or "on"

another region or element, it can be directly on the other region or element, or intervening regions or elements may be present.

The terminology used herein is for the purpose of describing particular embodiments only and is not intended to be limiting of the example embodiments. As used herein, the term "and/or" includes any and all combinations of one or more of the associated listed items. Further, the use of "may" when describing the example embodiments refers to one or more embodiments. As used herein, the singular forms "a," "an," and "the" are intended to include the plural forms as well, unless the context clearly indicates otherwise.

As used herein, the term "substantially", "about", and similar terms are used as terms of approximation and not as terms of degree, and are intended to account for the inherent deviations in measured or calculated values that would be recognized by those of ordinary skill in the art. Further, the term "substantially" used in combination with a feature that can be expressed as numeric value denotes a range of +/−5% of the value centered on the value.

FIG. 1 illustrates a schematic perspective view of a battery module 90. The battery module 90 may include a plurality of battery cells 10 that are arranged in one direction (e.g., a X-direction) and a heat exchange member 91 that is adjacent to a bottom surface of each of the plurality of battery cells 10. A pair of end plates 18 may face wide sides of end battery cells of the battery cells 10 at the outside of the battery cells 10. A connection plate 19 may extend, e.g., in the X-direction along sides of the battery cells 10 and be connected to the pair of end plates 18 such that the plurality of battery cells 10 may be fixed together. Fastening portions 18a on both sides of the battery module 90 may be fastened to a support plate 31 by bolts 40. The support plate 31 may be a part of a housing 30. The housing 30 may fully enclose battery module 90 including, e.g., the battery cells 10, electric interconnectors 15 and control electronics.

For example, each battery cell 10 may be a prismatic cell or a rectangular cell. The battery cells 10 may be stacked to face the wide sides thereof, e.g., in the X-direction. The stacked battery cells 10 may form the battery module 90. Further, each battery cell 10 may include a battery case that accommodates, e.g., an electrode assembly and an electrolyte. The battery case may be hermetically sealed by a cap assembly 14 including e.g., positive and negative electrode terminals 11 and 12 and a vent 13. The positive and negative electrode terminals 11 and 12 may have different polarities. The vent 13 may protect each battery cell 10 from exploding. For example, the vent 13 may be a safety hole of each battery cell 10 that may be a passage for exhausting gas, which is generated in each battery cell 10, to the outside of each battery cell 10. The positive and negative electrode terminals 11 and 12 of neighboring battery cells 10 may be electrically connected through a bus bar 15. The bus bar 15 may be fixed to the positive and negative electrode terminals 11 and 12 by a nut 16 or the like. Thus, the battery module 90 may be used as a power source unit that is formed by electrically connecting the plurality of battery cells 10 as one bundle.

For example, the battery cells 10 may generate heat when the battery cells 10 are charged and/or discharged. The generated heat may be accumulated in the battery cells 10. The accumulated heat in the battery cells 10 may accelerate the deterioration of the battery cells 10 and reduce a life span thereof. Thus, the battery module 90 further includes a heat exchange member 91, which is provided adjacent to the bottom surface of the battery cells 10 so as to cool down the battery cells 10. In addition, an elastic member 92, which is formed of an elastic material, may be interposed between the support plate 31 and the heat exchange member 91.

Figure 2:
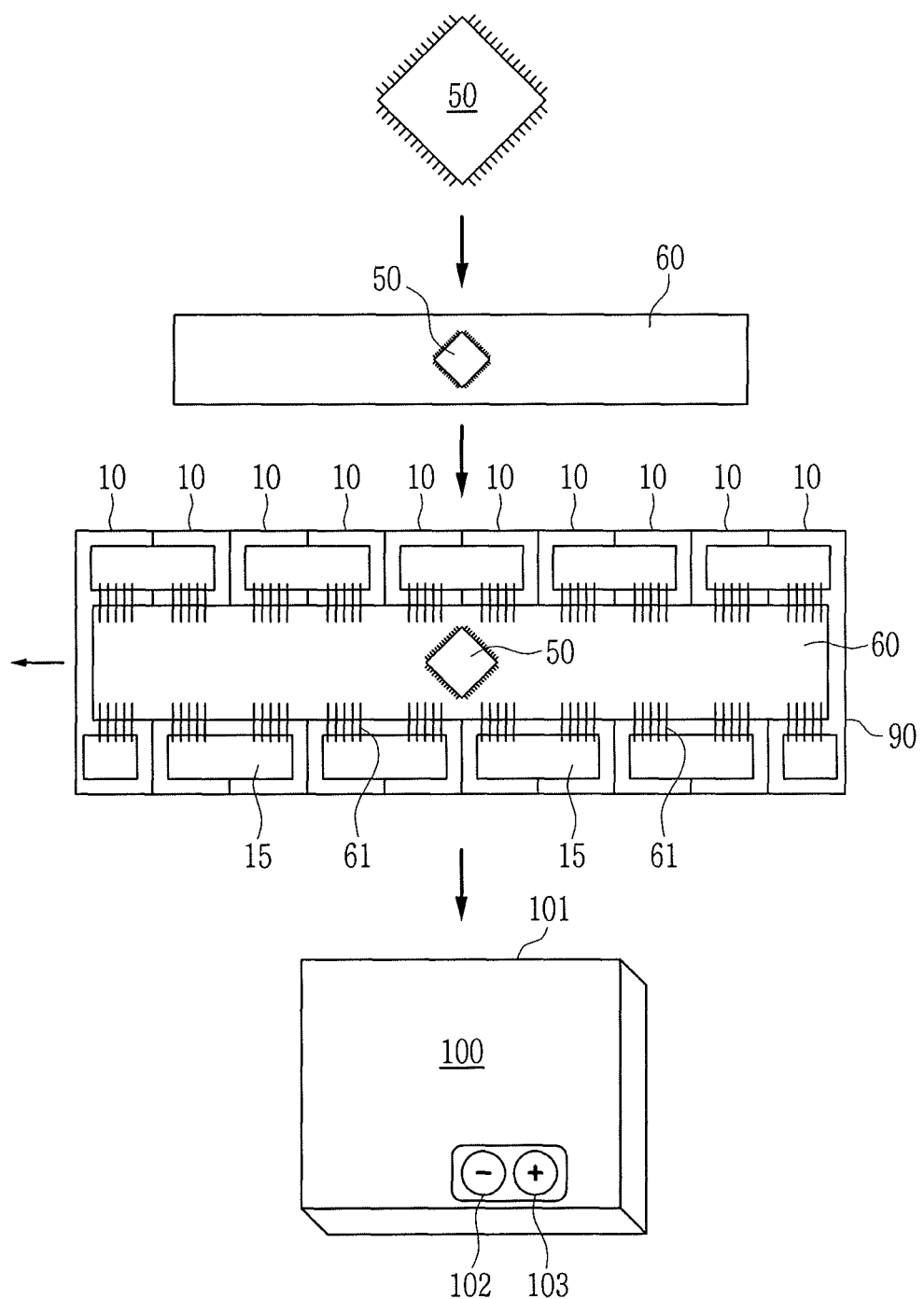
FIG. 2 illustrates an assembly of a battery system according to an embodiment.

FIG. 2 illustrates a workflow for manufacturing a battery system 100 according to an example embodiment. For example, the battery system 100 may include the battery module 90 in FIG. 1 and a control unit 50.

Referring to FIG. 2, in a first manufacturing step for manufacturing the battery system 100, a cell supervision circuit (CSC), e.g., a control unit 50, may be produced. For example, the control unit 50 may be produced through a production process by a semiconductor chip manufacturer. The production process may include fabrication steps of, e.g., a front end of line (FEOL), a back end of line (BEOL), dicing and packaging. Further, testing procedures may be performed on the control unit 50, e.g., before wafer dicing or packaging. Alternatively, at least one of the testing procedures may be performed on the control unit 50 after packaging the control unit 50. For example, particularly with respect to at least one control function of the control unit 50, electronic functions of the control unit 50 may be tested in the testing procedures. The testing procedures may include voltage measurement tests. In the voltage measurement tests, voltages of the control unit 50 may be measured. The measured voltages of the control unit 50 in the voltage measurement tests may be compared with predetermined voltages. Further, calibration data may be derived from the comparison between the measured voltages and the predetermined voltage and may be saved to the control unit 50. Additionally, stress tests may be performed on the control unit 50 by repeatedly performing some of electronic functions of the control unit 50.

Referring to FIG. 2, in a second manufacturing step for manufacturing the battery system 100, the control unit 50 may be assembled or mounted on a circuit carrier 60, e.g., a printed circuit board (PCB) or flexible circuit board. In an example embodiment, the control unit 50 may be a flip chip that is mounted on the circuit carrier 60. For example, electrical connections between the control unit 50 and the circuit carrier 60 may be formed by soldering. The soldering may degrade an analogue performance of the control unit 50.

Referring to FIG. 2, in a third manufacturing step for manufacturing the battery system 100, the circuit carrier 60 including the control unit 50 may be mounted to the battery module 90 in FIG. 1 that includes the plurality of secondary battery cells 10. For example, terminals of the battery cells 10 may be connected to the circuit carrier 60 via wire bonds 61. Thus, the battery cells 10 may be connected to the control unit 50 such that operating voltages may be supplied to the control unit 50 by at least one battery cell 10. For example, the control unit 50 may be activated by initially providing the operating voltage to the control unit 50 by at least one battery cell 10 or an additional battery for supplying the control unit 50 with a power. For example, the control unit 50 may be supplied by the at least one battery cell 10 or the additional battery during service life of the battery system 100. Further, the battery cells 10 may be interconnected via bus bars 15.

Referring to FIG. 2, in a fourth manufacturing step for manufacturing the battery system 100, a plurality of battery modules 90 may be electrically or physically connected to each other to form the battery system 100. For example, module terminals of the battery modules 90 may be connected to each other using system bus bars. Further, a plurality of cell supervision circuits (CSCs) 50 of the battery modules 90 may be connected to each other or to a battery management system (BMS) using a communication bus, e.g., a serial peripheral interface (SPI) or a controller area network (CAN). The plurality of interconnected battery modules 90 may be placed in a system housing 101. A cooling circuit may be set up for cooling the battery modules 90. Alternatively, the battery system 100 may not have the system housing 101 or the housing 30 in FIG. 1. The plurality of battery modules 90 may supply a system voltage and a system current via system terminals 102 and 103.

Figure 3:
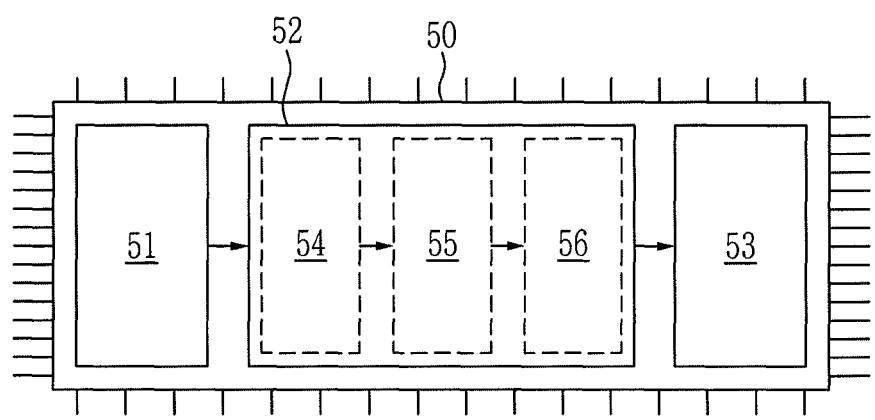
FIG. 3 illustrates a control unit according to an embodiment.

FIG. 3 illustrates a control unit 50 for a battery module 90 according to an example embodiment. For example, the control unit 50 may be one of the CSCs in the battery system 100 in FIG. 2. The control unit 50 may include a power input 51 for receiving an operating voltage of a control module 53. The power input 51 may be connected to at least one voltage supply. For example, the voltage supply may be at least one of the battery cells 10 of the battery module 90 of the battery system 100 or an additional battery for supplying the control module 53 with a power. The power input 51 may include a contact pad that is electrically connected to at least one battery cell 10, e.g., via at least one wire bond or the like.

In an example embodiment, referring to FIG. 3, the power input 51 may be electrically connected to the control module 53, e.g., via an access detection circuit 52. The control module 53 may perform at least one control function with respect to at least one battery cell 10. The control functions may include measurements of cell voltages, cell currents, cell resistances or cell capacities of a plurality of battery cells 10 and active or passive balancing of the cell voltages or the cell currents. The control module 53 may include at least one contact pad for an electric contact between at least one battery cell 10 and the control module 53. The electric contact may be formed via a wire bond 61. For example, the wire bond 61 may be different from the wire bond for connecting at least one battery cell 10 with the power input 51 of the control module 53.

Referring to FIG. 3, the access detection circuit 52 may include a light sensitive element 54, e.g., a light sensitive element, to detect light within the housing 30 of the battery module 90 in FIG. 1 or the system housing 101 of the battery system 100 in FIG. 2. For example, the light sensitive element 54 may be connected to a detection element 55 to receive a light signal output from the light sensitive element 54 and is representative of the detected light. The detection element 55 is further to output an access detection signal, if the light signal received from the light sensitive element 54 is indicative of light intensity within the housing 30 that exceeds a predetermined threshold. The output access detection signal is received by a state setting element 56 that is to alter a state of the control module 53 in response to receiving the access detection system of the detection element 55.

Figure 4:
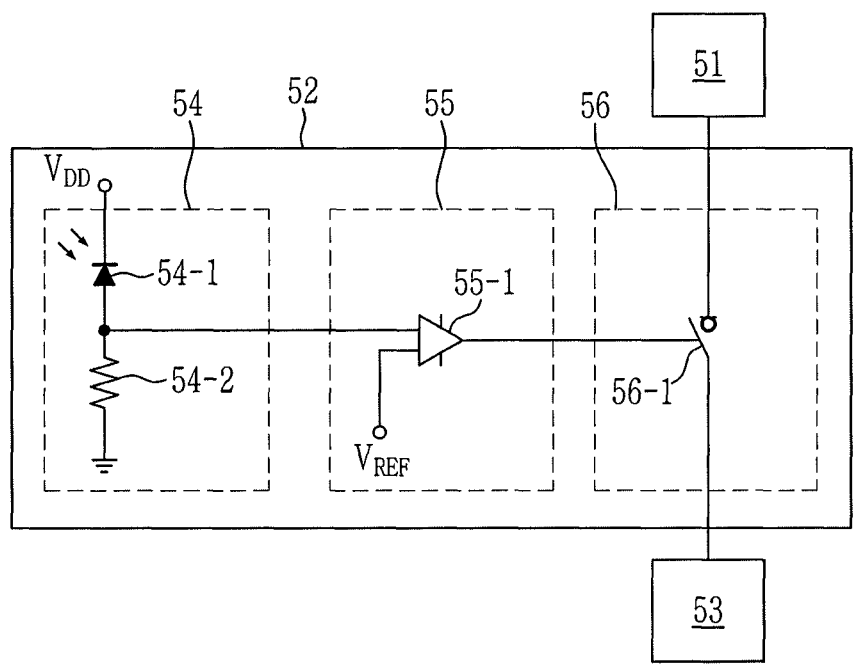
FIG. 4 illustrates an access detection circuit according to an embodiment.

FIG. 4 illustrates an access detection circuit 52 according to an example embodiment. For example, the light sensitive element 54 may include a voltage divider that is interconnected between an operating voltage $V_{DD}$ and a ground and includes an output node. For example, a photodiode 54_1 may be interconnected between the output node and the supply node $V_{DD}$. A resistor 54_2 may be interconnected between the output node and the ground. A voltage drop through the photodiode 54_1 may be changed according to an amount of light incident thereto. For example, a voltage at the output node of the voltage divider may be changed according to the light incident on the photodiode 54_1. For example, the voltage at the output node may be a light signal corresponding to the light incident on the photodiode 54_1.

The light signal may be transmitted to a comparator 55_1 of a detection element 55. For example, the light signal may be input to a non-inverting input of comparator 55_1. A reference signal $V_{REF}$ may be input to an inverting input of the comparator 55_1. Further, the comparator 55_1 may receive a supply voltage that may be derived from one or more of $V_{DD}$, $V_{REF}$, and that ground. The comparator 55_1 may output a high signal, e.g., "1", when a voltage of the light signal is greater than the reference signal $V_{REF}$ and output a low signal, e.g., "0", when the voltage of the light signal is smaller than the reference signal $V_{REF}$. Further, the reference voltage $V_{REF}$ may be indicative of a predetermined intensity threshold of light within the housing 30 or the system housing 101 of the battery system 100. In other words, the output of comparator 55_1 may be changed according to whether the light intensity in the housing 30 (or the system housing 101 of the battery system 100), which is detected by the photodiode 54_1, is greater or smaller than a predetermined intensity threshold. For example, the high output, e.g., "1", of the comparator 55_1 may be considered as the access detection signal.

The output of the comparator 55_1 may be transmitted to a switching element 56_1 of a state setting element 56 that is interconnected between a power input 51 and a control module 53 of a control unit 50 as described above. For example, a conductivity of the switching element 56_1 may be adjusted according to the output of the comparator 55_1. For example, the switching element 56_1 may be a transistor, e.g., a bipolar p-channel PNP transistor. The bipolar p-channel PNP transistor may be conductive when a low signal is applied to a base of the bipolar p-channel PNP transistor and may be non-conductive when a high signal is applied to the base of the bipolar p-channel PNP transistor. Alternatively, the switching element 56_1 may be a MOSFET transistor. For example, the switching element 56_1 may be non-conductive when the voltage of the light signal is greater than the reference voltage $V_{REF}$ and may be conductive when the voltage of the light signal is smaller than the reference voltage $V_{REF}$. For example, when the switching element 56_1 is non-conductive (i.e., when the switching element 56_1 is turned off), the control module 53 may not supplied by the power input 51 and may not perform the at least one control function with respect to the at least one battery cell 10.

Figure 5:
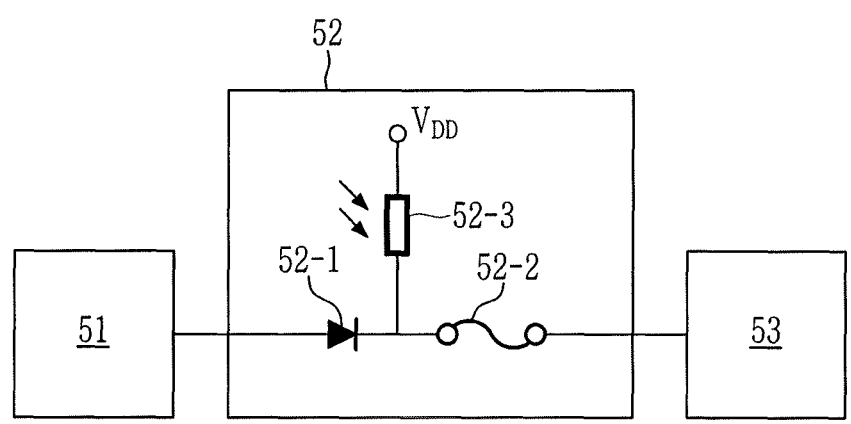
FIG. 5 illustrates an access detection circuit according to another embodiment.

FIG. 5 illustrates an access detection circuit according to another example embodiment. For example, the access detection circuit 52 may be interconnected between a power input 51 and a control module 53 of a control unit 50. A conductive path may be formed between the power input 51 and the control module 53. A diode 52_1 and a fuse 52_2 may be arranged in the conducting path. For example, an anode of the diode 52_1 may be connected to the power input 51. A cathode of the diode 52_1 may be connected to the fuse 52_2. For example, the fuse 52_2 may correspond to the state setting element 56 in FIG. 3. A voltage $V_{DD}$ may be connected to the conducting path via a light detection resistor 52_3. The light detection resistor 52_3 may be connected at a node between the diode 52_1 and fuse 52_2, an ohmic resistance of the light detection resistor 52_3 may decreases as an intensity of light incident on the light detection resistor 52_3 increases. For example, when the intensity of the light on the light detection resistor 52_3 is greater than a predetermined intensity threshold, the ohmic resistance of the light detection resistor 52_3 may be low, and a voltage drop through the light detection resistor 52_3 may be low. Thus, a current flowing into the fuse 52_2 through the light detection resistor 52_3 and a voltage, which is applied to the fuse 52_2 and is reduced from the operating voltage $V_{DD}$ by the voltage drop through the light detection resistor 52_3, may be sufficient to burn the fuse 52_2. Thus, the control module 53 may be cut from the power input 51 and may not perform the at least one control function with respect to the at least one battery cell 10.

Alternatively, instead of the light detection resistor 52_3 between the operating voltage $V_{DD}$ and the fuse 52_2, a photovoltaic cell may be connected to the node between diode 52_1 and fuse 52_2. For example, a current, which is supplied to the fuse 52_2 from the photovoltaic cell, may be sufficient to burn the fuse 52_2 when a light incident on the photovoltaic cell is greater than a predetermined intensity threshold.

Thus, in those implementations, the fuse 52_2 may be cut off such that the current supplied from power input 51 to the control module 53 may be stopped. In contrast, when the current from the photovoltaic cell to the fuse 52_2 is not sufficient to burn the fuse 52_2, the current from power input 51 may be supplied to the control module 53.

By using of summation and review, one or more embodiments may provide a battery system that enables detection and/or prevention of unauthorized misuse, analysis and/or manipulation of the battery system.

In an example embodiment, a control unit for a battery module or battery system may be provided, particularly for a battery module or battery system with a plurality of battery cells fully enclosed in a housing. For example, the control unit may include a control module that is configured for performing at least one control function with respect to at least one of the plurality of battery cells, e.g., a battery management system (BMS), a battery system monitor (BSM), a battery management unit (BMU), a cell monitoring module (CSC), or the like. The control unit may further include an access detection circuit that is connected to the control module and that includes a light sensitive element disposed within the housing. The light sensitive element may detect light intensity within the housing and light incident on the light sensitive element. For example, the light sensitive element may detect an intensity of light, e.g., visible light, within the housing. The access detection circuit may operate the light sensitive element and may output an access detection signal when a light intensity within the housing is greater than a predetermined threshold, e.g., a predetermined intensity threshold. Further, the control unit may alter a state of the control module in response to the access detection signal. Thus, a state of the control module may be altered directly or indirectly in response to the access detection signal from the access detection circuit.

For example, a battery module or a battery system, enclosed by a housing may not have any light inside the battery module or the battery system during a normal use of the battery module or system. For example, when the battery module or the battery system is opened, e.g., without any authorization, the battery module or the battery system may detect the unauthorized opening thereof by detecting, e.g., visible light within the housing. For example, in order to prevent a false positive, an access detection signal may be set to be output when light intensity is greater than a predetermined threshold. Thus, the access detection signal may indicate an opening of the battery module or the battery system. Thus, in response to the access detection signal, the state of the control module, e.g., the opening of the battery module or the battery system may be alerted in a specific way. In other words, an attempt to manipulate a battery module or the battery system may be alerted by detecting an opening of the housing that enclose the battery module and the battery system. Thus, the access detection signal may initiate appropriate measures in response thereto.

In an example embodiment, a control module may be one of a BMS, BSM, BMU, CSC or the like and may further be an electronic circuit that is configured for controlling an individual battery cell. For example, a control module may include one or more integrated circuits (ICs) mounted on a circuit carrier, e.g., a printed circuit board (PCB). A control module according to an example embodiment may be powered by at least one battery cell that is controlled by the control module unit, e.g., as a part of the battery system or the battery module that is controlled by the control module. Alternatively, the control module may be powered by at least one additional battery cell that is not part of the controlled batteries.

According to an example embodiment, a control module may perform at least one control function with respect to at least one battery cell. A smooth or optimal function of a battery cell may be controlled by the control module. The at least one control function may include measurements of cell voltages, cell currents, cell resistances or cell capacities of a plurality of battery cells and may further include the active or passive balancing of the cell voltages or the cell currents. Further, the control module may communicate with other control units of the battery module, the battery system, or an electric vehicle, using known circuit designs for performing one or more of these functions. In order to perform the at least one control function, the control unit and the control module may be supplied with an operating voltage.

For example, as the control module performs at least one control function with respect to at least one battery cell of the battery module or the battery system, the control module may change a state of the battery module or the battery system when a state of the control module is changed. Further, when the state of the control module is changed, a state of a memory of the control module may be changed, e.g., by storing therein information that indicates the opening of the housing of the battery module or the battery system. For example, the control unit may alter the state of the hardware of the control module and/or the state of software of the control module in response to the access detection signal. For example, an alteration of a state of a software may include altering an information in a memory of the control module. Thus, various measurements may be initiated in response to the access detection signal and the function of the control unit may be applied to the specific application case.

In an example embodiment, the housing of the battery module or the battery system may be made of a variety of materials. For example, the materials of the housing may block light in a wavelength range that is detected by the light sensitive element such that the light sensitive element does not output an access detection signal when the housing of the battery module or the battery system is not opened. For example, a metal, e.g., aluminum, may be used to achieve a mechanical rigid design to protect the inner parts from environmental impacts or to protect the environment from any hazards in case of battery failure. Further, the housing may consist at least two shells that are connected to each other by screws, adhesive or welding or the like. For example, an operation of the battery system or the battery module does not require any opening the housing or any access to inside of the housing. Thus, any signal, which is output from the light sensitive element, may indicate an unintended operation of the battery module or the battery system. Thus, a predetermined threshold of a light intensity may be set to output the access detection signal when the light intensity is greater than that the predetermined threshold.

In an example embodiment, the control unit may store the access detection signal in a memory of the control unit. In other words, the output of the access detection signal may be an event that is stored in a memory, e.g., with a time and/or a date of the output of the access detection signal. For example, the access detection signal may be stored in a memory of the control module, of which the state is altered. In an example embodiment, the attempt of opening the battery module or the battery system may be detected afterwards, e.g., in and from an authorized repair station.

In an example embodiment, the control unit may disable at least one function of the control module in response to the access detection signal. As set forth above, the at least one control function may be required for smooth or optimal function of the battery cells of the battery module or the battery system. According to an example embodiment, the at least one control function may be required for any operation or function of the battery cells. Thus, by disabling the at least one function of the control module, the operation of the battery module or the battery system may be stopped in response to detecting an opening of the housing. Thus, any unwanted manipulation on or reverse engineering of the battery module or the battery system may be prevented. Further, the embodiments may increase safety for a user of the battery module or the battery system, as high voltages and currents are ceased when the housing is opened.

In an example embodiment, the control unit may control the enablement of the at least one function of the control module by an original equipment manufacturer (OEM). In other words, the alteration of the state of the control module, either on hardware or software level, may be reversible. For example, a bit set in response to the access detection signal for preventing a normal function of the battery module may be deleted by the OEM. Alternatively, a component, which is destroyed, e.g., a fuse burned, in response to the access detection signal, may be replaced by the OEM. For example, in larger HV traction batteries, inner parts, e.g., battery cells, electric interconnectors, or electronics, may be replaced in a workshop of the OEM in order to prolong the lifetime of the battery and/or in the case of malfunctions. The embodiments may have advantages for providing such services of an OEM and for refurbishing a battery module or the battery system that has been shut down in response to an unauthorized opening of the battery housing.

In an example embodiment, the light sensitive element may output a light signal that changes according to an amount of light incident on the light sensitive element within the housing. Alternatively, the light sensitive element may output a light signal when the incident light intensity is greater than a predetermined threshold. In an example embodiment, the light signal may correspond to the access detection signal. For example, the light sensitive element may include at least one of, e.g., a light dependent resistor, a photo diode, and a photovoltaic element. Each of these light sensitive elements may have specific advantages as described in more detail below.

For example, when the light sensitive element is to output a light signal corresponding to light incident thereon, the control unit may include a detection element to receive the light signal and to determine whether the light intensity in the housing exceeds a predetermined intensity threshold based on the light signal. Thus, when the light signal is a voltage, the detection element may detect whether the light signal exceeds a predetermined voltage. When the light signal is a current, the detection element may detect whether the light signal exceeds a predetermined current. According to an example embodiment, the detection element may output the access detection signal when it is determined that the light intensity in the housing exceeds the predetermined intensity threshold. According to an example embodiment, a common light sensitive element may be mounted to the housing of the battery module or the battery system, and the determination of whether an opening of the housing is occurred is performed by the common light sensitive element.

In an example embodiment, the control unit may include a state setting element that is configured to receive either the light signal emitted by the light sensitive element or the access detection signal output from the detection element. For example, the state setting element may alter the state of the control module based on the received signal, i.e. according to whether or not the access detection signal is received or an intensity/height value of the detected light signal. In other words, the state setting element may alter the state of the control module when the received signal indicates an opening of the battery module or the battery system housing.

In an example embodiment, the control unit may include a power input that is configured to receive an operating voltage of the control unit. In other words, an operating voltage of the control unit and its constituents, e.g., the control module, may be supplied to the power input. For example, the power input may provide the operating voltage to the control module. According to an example embodiment, the state setting element may include a switching element that is disposed between the power input and the control module of the control unit. For example, the state setting element may set the switching element to be non-conductive in response to the access detection signal. Thus, the power input may cut off from the control module. Thus, the operating voltage of the control module may not be longer supplied thereto. For example, the at least one control function with respect to at least one battery cell of the battery module or the battery system may be ceased. Thus, the battery module or the battery system may be shut down in response to an opening of the housing thereof.

According to another embodiment, the state setting element of the control unit may include at least one fuse that is configured to be set to be non-conductive when the received signal exceeds a predetermined threshold. In other words, when the state setting element receives the light signal, the fuse may be set to be non-conductive when the light signal exceeds a predetermined threshold. Further, when the state setting element is to receive the access detection signal, the fuse may be set to be non-conductive in response to the access detection signal and/or if the access detection signal exceeds a predetermined threshold. For example, the at least one fuse may be at least one fuse bit that is set to be non-conductive by fusing, i.e., melting or burning. For example, information, e.g., the number of multiple openings, may be stored in the control unit by using multiple fuses e.g., fuse bits.

In an example embodiment, the energy for setting the at least one fuse to be non-conductive may be provided by or via the light sensitive element. For example, the light sensitive element may be a photovoltaic cell. The current/voltage output by the photovoltaic cell in response to a light intensity exceeding a predetermined threshold may be sufficient in burning the fuse. Alternatively, the light sensitive element may be a light dependent resistor (LDR) that is interconnected between a voltage or power source and the at least one fuse. For example, in response to an incident light intensity exceeding a predetermined threshold, the resistance of the LDR drops so that a current passing through the LDR may be sufficient in burning the at least one fuse.

In an example embodiment, a battery module or battery system may include a plurality of battery cells that is fully enclosed by a housing and includes a control unit. The control unit may be at least part of at least one of a battery management system (BMS), a Battery System Manager (BSM), a battery monitoring unit (BMU) or a cell supervision circuit (CSC) of the battery system. The battery system may further include a cooling system.

In an example embodiment, a method for operating a battery module or a battery system may include at least one step of performing, via the control module, at least one control function with respect to at least one battery cell. For example, performing of the at least one control function may be required for smooth, optimal or any operation of the at least one battery cell and the battery module or the battery system. The method may include a step of detecting, via the light sensitive element, a light within the housing that is incident on the light sensitive element. For example, the detection may be provided by outputting a light signal (or a access detection signal) only when the incident light intensity exceeds a predetermined threshold or by outputting a light signal proportional to an intensity of incident light to a detection element that determines whether or not it corresponds to an intensity is greater than the predetermined threshold. The method may further include a step of outputting, via the access detection circuit, an access detection signal in response to detecting that the light intensity within the housing exceeds the predetermined threshold. Further, in the method in response to the access detection signal a state of the control module may be altered, e.g., by setting a switching element or a fuse non-conductive.

In an example embodiment, altering the state of the control module may include a step of disabling at least one function of the control module in response to the access detection signal. The method may further include a step of enabling the at least one control function of the control module, i.e., the control function which has been disabled before, by an original equipment manufacturer, OEM. Thus, the OEM may advantageously refurbish battery modules or the battery systems that were inactivated in response to an opening of the housing and provide services to battery modules or the battery systems without altering an operation state of a control module thereof in a persistent manner.

Electronic or electric devices and/or any other relevant devices or components according to embodiments described herein may be implemented utilizing any hardware, firmware, e.g., an application-specific integrated circuit, an application-specific integrated circuit (ASIC), software, or a combination of software, firmware, and hardware. For example, the various components of these devices may be formed on an integrated circuit (IC) chip or on separate IC chips. Further, the various components of these devices may be implemented on a flexible printed circuit film, a tape carrier package (TCP), a printed circuit board (PCB), or formed on a substrate. Further, the various components of these devices may be a process or thread, running on one or more processors, in one or more computing devices, executing computer program instructions and interacting with other system components for performing the various functionalities described herein. The computer program instructions may be stored in a memory that is implemented in a computing device using a standard memory device, e.g., a random access memory (RAM). The computer program instructions may also be stored in other non-transitory computer readable media, e.g., a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiment.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A controller for controlling a battery module including a plurality of battery cells in a housing, the controller comprising:
   a control module to perform at least one control function with respect to at least one of the plurality of battery cells; and
   an access detection circuit, including a light sensitive element in the housing, wherein:
   the light sensitive element is connected directly to a fuse,
   the light sensitive element is to output a light signal corresponding to a light incident on the light sensitive element in the housing, and
   the fuse receives the light signal from the light sensitive element and is configured to burn to an open state so as to cut a power input to the control module when an intensity of the light incident on the light sensitive element is greater than a predetermined intensity threshold.

2. A method for operating a battery module including a controller and a plurality of battery cells in a housing, the method comprising:
   performing at least one control function with respect to at least one of the plurality of battery cells, by a control module of the controller;
   detecting a light intensity in the housing and outputting a corresponding a light signal;
   providing the light signal to a fuse; and
   burning the fuse to an open state so as to cut a power input to the control module when an intensity of the light incident on the light sensitive element is greater than a predetermined intensity threshold.

3. The controller as claimed in claim 1, further comprising a power input to receive an operating voltage of the controller and to provide the operating voltage to the control module, wherein:
   the fuse is between the power input and the control module.

4. The controller as claimed in claim 1, wherein the light sensitive element includes at least one of a light dependent resistor, a photo diode, and a photovoltaic element.

5. A battery system, comprising:
   a battery module including a plurality of battery cells in a housing; and
   the controller as claimed in claim 1.

* * * * *